(12) United States Patent
Wang et al.

(10) Patent No.: US 8,537,307 B2
(45) Date of Patent: Sep. 17, 2013

(54) DISPLAY PANEL HAVING FIRST AND SECOND LIQUID CRYSTAL LAYERS AND FIRST AND SECOND ACTIVE DEVICE ARRAYS

(75) Inventors: Po-Hsien Wang, Taichung (TW); Cheng-Chieh Liu, Taichung (TW); Jyh-Yeuan Ma, Taoyuan County (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 95 days.

(21) Appl. No.: 13/171,483

(22) Filed: Jun. 29, 2011

(65) Prior Publication Data

US 2011/0317086 A1     Dec. 29, 2011

(30) Foreign Application Priority Data

Jun. 29, 2010   (CN) .......................... 2010 1 0213952

(51) Int. Cl.
*G02F 1/1335*   (2006.01)
*G02F 1/1345*   (2006.01)

(52) U.S. Cl.
USPC .................. 349/73; 349/5; 349/149; 349/151

(58) Field of Classification Search
USPC ........................................ 349/5, 73, 149, 151
See application file for complete search history.

(56) References Cited

U.S. PATENT DOCUMENTS

| | | | | |
|---|---|---|---|---|
| 6,104,457 | A * | 8/2000 | Izumi et al. ...................... | 349/73 |
| 2002/0001051 | A1 * | 1/2002 | Krusius et al. .................. | 349/73 |
| 2004/0031672 | A1 | 2/2004 | Wen | |
| 2008/0122824 | A1 * | 5/2008 | Lee ................................ | 345/211 |
| 2009/0141213 | A1 * | 6/2009 | Chiu ................................ | 349/73 |
| 2009/0185098 | A1 * | 7/2009 | Bae et al. ........................ | 349/58 |

FOREIGN PATENT DOCUMENTS

| | | |
|---|---|---|
| CN | 1435708 | 8/2003 |
| CN | 1441290 | 9/2003 |
| CN | 1821843 | 8/2006 |
| TW | 200633224 | 9/2006 |
| TW | 200725568 | 7/2007 |
| TW | M342517 | 10/2008 |
| TW | 200923477 | 6/2009 |
| WO | 2009066436 | 5/2009 |

OTHER PUBLICATIONS

"First Office Action of China Counterpart Application", issued on Jan. 28, 2013, p. 1-5, in which the listed references were cited.
"Office Action of Taiwan Counterpart Application", issued on May 31, 2013, p. 1-p. 7, in which the listed references were cited.

* cited by examiner

*Primary Examiner* — Michael Caley
(74) *Attorney, Agent, or Firm* — Jianq Chyun IP Office

(57) ABSTRACT

A display panel including a first substrate having a first panel area and a second panel area, a second substrate disposed above the first panel area, a third substrate disposed above the second panel area, a first liquid crystal layer disposed between the first substrate and the second substrate, a second liquid crystal layer disposed between the first substrate and the third substrate, a first active device array disposed on the first substrate to drive the first liquid crystal layer, a second active device array disposed on the third substrate to drive the second liquid crystal layer, an integrated circuit (IC), and a conductive element is provided. The IC is disposed on the third substrate. The conductive element is disposed between the first substrate and the third substrate to electrically connect the IC to the first active device array.

7 Claims, 2 Drawing Sheets

DISPLAY PANEL HAVING FIRST AND SECOND LIQUID CRYSTAL LAYERS AND FIRST AND SECOND ACTIVE DEVICE ARRAYS

CROSS-REFERENCE TO RELATED APPLICATION

This application claims the priority benefit of China application serial no. 201010213952.3, filed on Jun. 29, 2010. The entirety of the above-mentioned patent application is hereby incorporated by reference herein and made a part of this specification.

BACKGROUND OF THE INVENTION

1. Field of the Invention

The invention relates to a display panel and, more particularly, to a display panel having two display functions.

2. Description of Related Art

The known thin film transistor liquid crystal displays (TFT-LCDs) with the characteristics such as light weight, thin volume, low power consumption, power saving, and the like, have replaced the conventional cathode ray tube (CRT) displays as a mainstream among the forthcoming displays. The TFT-LCDs are commonly applied in the small size products such as mobile phones, in the medium size products such as portable players, and further in the large size products such as liquid crystal televisions. However, the TFT-LCD product having a large size, i.e. a size of 50 inch to 100 inch, is characterized by high cost so that most consumers cannot afford it.

Therefore, the display apparatuses applied with a projection display technique such as a reflective projection display apparatus, a rear projection display apparatus, and the like are provided and the projection display technique mainly includes using a reflective type liquid crystal on silicon (LCOS) display panel. The LCOS display panel has the advantages such as low cost, high aperture ratio, high resolution (the size of a pixel can be 12 µm or smaller, etc.

Accordingly, the technique is further applied in micro projection display technique in resent years and the products such as a pico-projector and a head-up projection display system are developed. In addition, the mobile phone producer further combine the display technique with the mobile phone for achieving the user to project the file, the picture, or the movies stored in the mobile phone anytime and anywhere. However, the design requires assembling the display panel for displaying and the display panel for projecting together so that the size of the product is 2 to 3 times of a normal mobile phone. Accordingly, the application of the micro projection display technique is still restricted.

SUMMARY OF THE INVENTION

The invention is directed to a display panel containing two display units to simultaneous have a directly display function and a projection display function.

The invention provides a display panel including a first substrate, a second substrate, a third substrate, a first liquid crystal layer, a second liquid crystal layer, a first active device array, a second active device array, an integrated circuit (IC), and a conductive element. The first substrate has a first panel area and a second panel area. The second substrate is disposed over the first panel area. The third substrate is disposed over the second panel area. The first liquid crystal layer is disposed between the first substrate and the second substrate and located in the first panel area. The second liquid crystal layer is disposed between the first substrate and the third substrate and located in the second panel area. The first active device array is disposed on the first substrate to drive the first liquid crystal layer. The second active device array is disposed on the third substrate to drive the second liquid crystal layer. The integrated circuit is disposed on the third substrate. The conductive element is disposed between the first substrate and the third substrate to electrically connect the integrated circuit with the first active device array.

In light of the foregoing, the LCOS display unit and the TFT-LCD unit are combined within one TFT array substrate according to the invention. Meanwhile, the driving circuit of the TFT array substrate is formed in the silicon substrate of the LCOS display unit. Accordingly, the display panel has both the directly display function and the projection display function without distinctly increased in size so as to be conducive to be applied in a portable product.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

An LCOS display panel uses the elements arranged on a silicon substrate to control the display status of the liquid crystals. The application of the LCOS display panel in a compact projector, a head-up projection display system, and the like is more and more popular. The LCOS display panel has many characteristics superior to other liquid crustal display panels. For example, the silicon crystal of the silicon substrate can be used for forming the active matrix device of the LCOS display panel. The silicon substrate itself can be used for forming a thin film transistor driver and circuits with other functions by the well known and effective semiconductor manufacturing technique. Accordingly, a display panel combined the projection display technique with the directly display technique is provided herein to help to widely increase the application of the display panel. As such, a single display panel can have both the projection display function and the directly display function. In addition, the volume of the apparatus is not largely increased according to the invention so that the requirement of compact volume is satisfied.

Figure 1:
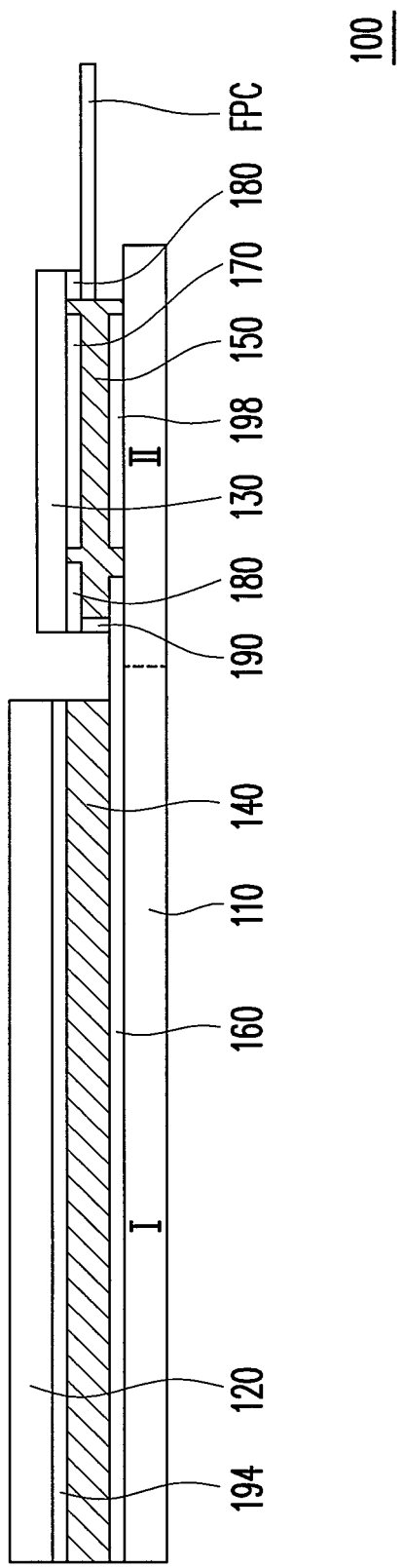
FIG. 1 illustrates a cross sectional view of a display panel according to an embodiment of the invention.

FIG. 1 illustrates a cross sectional view of a display panel according to an embodiment of the invention. Referring to FIG. 1, a display panel 100 includes a first substrate 110, a second substrate 120, a third substrate 130, a first liquid crystal layer 140, a second liquid crystal layer 150, a first active device array 160, a second active device array 170, an integrated circuit 180, a conductive element 190, a first common electrode 194, and a second common electrode 198. The first substrate 110 has a first panel area I and a second panel area II. The second substrate 120 is disposed over the first panel area I and the third substrate 130 is disposed over the second panel area II, wherein the second substrate 120 and the third substrate 130 are located at a same side of the first substrate 110. The first liquid crystal layer 140 is disposed between the first substrate 110 and the second substrate 120 and located in the first panel area I. The second liquid crystal layer 150 is disposed between the first substrate 110 and the third substrate 130 and located in the second panel area II.

Furthermore, the first active device array 160 is disposed between the first substrate 110 and the first liquid crystal layer 140 and the first common electrode 194 is disposed between the second substrate 120 and the first liquid crystal layer 140. The first active device array 160 and the first common electrode 194 are opposite to each other. Accordingly, the first liquid crystal layer 140 is driven by the first active device array 160 and the first common electrode 194 to display images.

Similarly, the second active device array 170 is disposed between the third substrate 130 and the second liquid crystal layer 150 and the second common electrode 198 is disposed between the first substrate 110 and the second liquid crystal layer 150. The second active device array 170 and the second common electrode 198 are opposite to each other. Accordingly, the second liquid crystal layer 150 is driven by the second active device array 170 and the second common electrode 198 to display images. In other words, the first panel area I and the second panel area II are two independent display areas. Therefore, in one embodiment, the display panel 100 can selectively display different images or the same image in the first panel area I and the second panel area II.

It is noted that the third substrate 130 is a silicon substrate. In addition, the first active device array 160 is, for example, a thin film transistor array and the second active device array 170 is, for example, a metal oxide semiconductor (CMOS) transistor array. Namely, the elements in the first panel area I constitute a TFT-LCD unit and the elements in the second panel area II constitute a LCOS display unit. Accordingly, the display method of the display panel 100 in the first panel area I is the directly display method and that in the second panel area II is the projection display method. That is to say, a used directly watches the display panel 100 to obtain the displayed images in the first panel area I. The image displayed in the second panel area II is required to be projected on a screen such as a wall, a table surface, or the like, to be obtained by the user. As a whole, the display panel 100 has both the directly display function and the projection display function by disposing merely three substrates so as to be conducive to reduce the volume of the whole product.

Owing that the third substrate 130 is the silicon substrate, the integrated circuit 180 can be directly formed on the third substrate 130 according to the present embodiment, wherein the integrated circuit 180 can be located at the periphery of the second active device array 170. Moreover, the conductive element 190 is disposed between the first substrate 110 and the third substrate 130. The conductive element 190 can be conductive gel such as anisotropic conductive film (ACF) and silver glue, conductive spacers, conductive sealant, and the like. The conductive element 190 is disposed to electrically connect the integrated circuit 180 with the first active device array 160. Therefore, the driving circuit of the first active device array 160 can be directly formed on the silicon substrate of the LCOS display unit, i.e. be combined in the integrated circuit 180. In addition to the elements mentioned above, the display panel 100 does not require other driving chip so as to further simplify the volume design.

Certainly, the integrated circuit 180 can be electrically connected to the second active device array 170 to drive the second active device array 170. Namely, the integrated circuit 180 can further contain the driving circuit of the second active device array 170. When the display panel 100 is applied in a real electronic product, the third substrate 130 can be connected to a flexible circuit board FPC to connect to an external circuit (not shown) such as a control unit of the electronic product through the flexible circuit board FPC. The external circuit is used for transmitting the information of to-be display images to the integrated circuit 180 via the flexible circuit board FPC. Accordingly, the integrated circuit 180 is capable of driving the first active device array 160 and the second active device array 170 to change the display status of the first liquid crystal layer 140 and the second liquid crystal layer 150. In other words, the TFT-LCD unit and the LCOS display unit are both driven by the circuit units in the integrated circuit 180. In addition, a portion of the circuits in the integrated circuit 180 can be shared by the first active device array 160 and the second active device array 170 so as to reduce the volume of the integrated circuit 180 and simplify the layout thereof.

Figure 2:
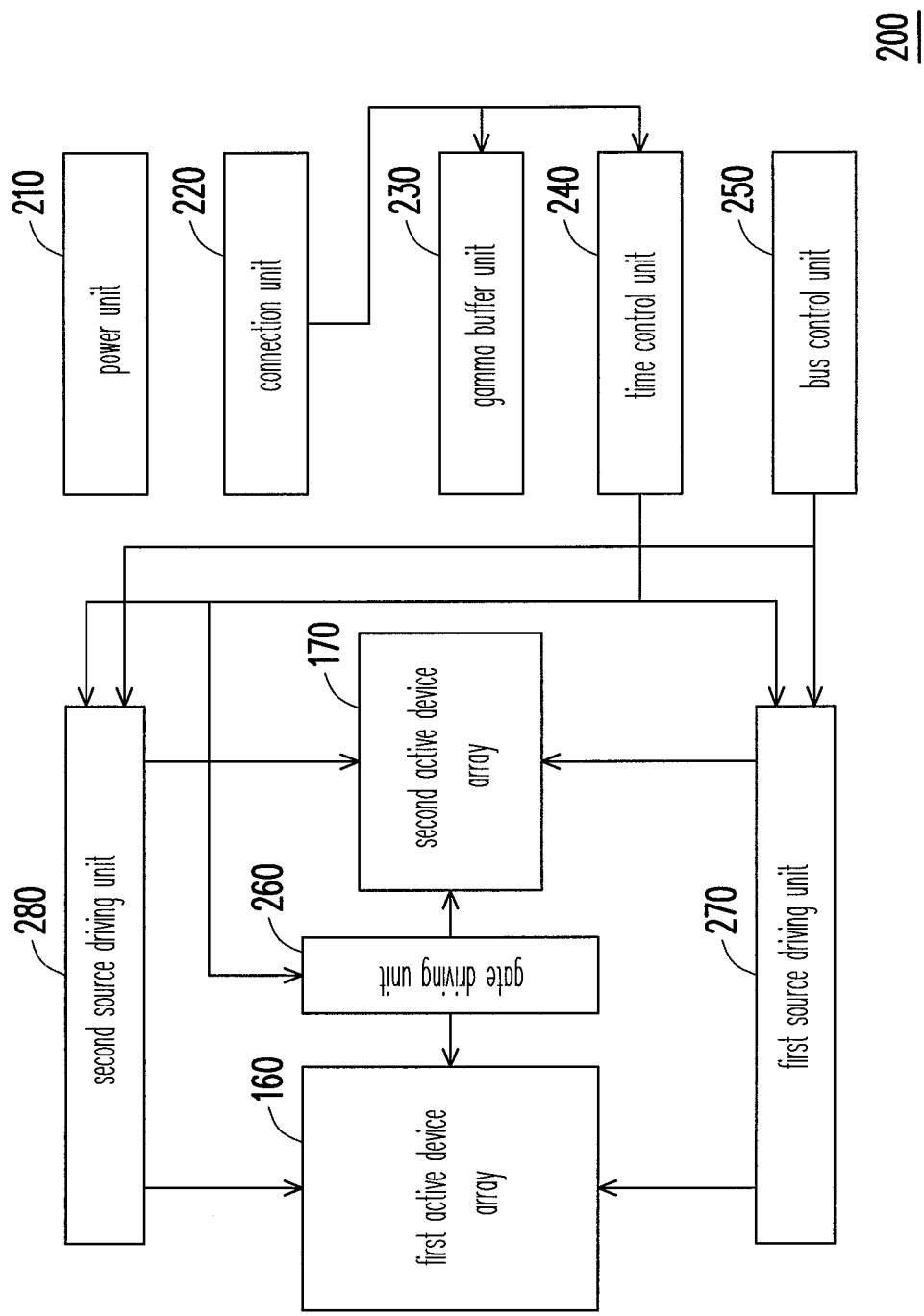
FIG. 2 illustrates schematic block diagram showing the integrated circuit coupled to the first active device array and the second active device array according to an embodiment of the invention.

For instance, FIG. 2 illustrates schematic block diagram showing the integrated circuit coupled to the first active device array and the second active device array according to an embodiment of the invention. Referring to FIG. 2, the integrated circuit 200 includes a power unit 210, a connecting unit 220, a gamma buffer unit 230, a time control unit 240, a bus control unit 250, a gate driving unit 260, a first source driving unit 270, and a second source driving unit 280.

The gate driving unit 260, the first source driving unit 270, and the second source driving unit 280 are coupled to the first active device array 160 and the second active device array 170. The time control unit 240 is simultaneously coupled to the gate driving unit 260, the first source driving unit 270, and the second source driving unit 280 and the bus control unit 250 is coupled to the first source driving unit 270 and the second source driving unit 280. In addition, the control unit 220 is coupled to the gamma buffer unit 230 and the time control unit 240. The power unit 210 is used for receiving the power.

In the present embodiment, the connecting unit 220 is used for receiving the serial clocking and the serial data from the external circuit (not shown) and transmitting the same to the gamma buffer unit 230 and the time control unit 240. Accordingly, the correct series is input from the time control unit 240 into the gate driving unit 260, the first source driving unit 270, and the second source driving unit 280. In addition, the bus control unit 250 is used for receiving the image information from the external circuit and transmitting the image information to the first source driving unit 270 and the second source driving unit 280. The gate driving unit 260, the first source driving unit 270, and the second source driving unit 280 are capable of inputting the image information to the first active device array 160 and the second active device array 170 based on the correct series.

The above-listed circuit units are only exemplary and not intended to limit the invention. In other embodiments, the first source driving unit 270 and the second source driving unit 280 can be combined together so that the integrated circuit 200 can optionally has merely one source driving unit. In addition, the integrated circuit 200 can include the circuits with other functions. It is noted that a portion of the circuit units required to drive the first active device array 160 and the second active device array 170 can be combined together. Accordingly, the volume required for disposing the integrated circuit 200 is much smaller than the total volume of two driving chips so that the whole apparatus can has compact volume.

In view of the above, the display panel of the invention has both the directly display function and the projection display function, wherein the projection display function is achieved by an LCOS display unit. In addition, the integrated circuit is directly formed on the silicon substrate of the LCOS display unit in the invention to be served as the driving circuit of the directly display unit. Therefore, in addition to the silicon substrate of the LCOS display unit, the display panel does not require other driving chip so as to simplify the volume design. In other words, the display panel according to the invention can have both the directly display function and the projection display function without significantly increased the volume of the whole apparatus.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display panel, comprising:
   a first substrate, having a first panel area and a second panel area;
   a second substrate disposed over the first panel area;
   a third substrate disposed over the second panel area, wherein the third substrate is a silicon substrate;
   a first liquid crystal layer disposed between the first substrate and the second substrate and located in the first panel area;
   a second liquid crystal layer disposed between the first substrate and the third substrate and located in the second panel area;
   a first active device array disposed on the first substrate to drive the first liquid crystal layer;
   a second active device array disposed on the third substrate to drive the second liquid crystal layer;
   an integrated circuit disposed on the third substrate; and
   a conductive element disposed between the first substrate and the third substrate to electrically connect the integrated circuit with the first active device array.

2. The display panel according to claim 1, wherein the first active device array comprises a thin film transistor (TFT) array.

3. The display panel according to claim 1, wherein the second active device array comprises a metal oxide semiconductor (MOS) transistor array.

4. The display panel according to claim 1, wherein the second substrate and the third substrate are located at a same side of the first substrate.

5. The display panel according to claim 1, wherein the integrated circuit is further electrically connected to the second active device array to drive the second active device array.

6. The display panel according to claim 5, wherein the integrated circuit comprises a time control unit, a gate driver, and a source driver, the time control unit is coupled to the gate driver and the source driver, the gate driver and the source driver are coupled to the first active device array and the second active device array.

7. The display panel according to claim 1, further comprising a first common electrode and a second common electrode, the first common electrode is disposed between the second substrate and the first liquid crystal layer, and the second common electrode is disposed between the first substrate and the second liquid crystal layer.

* * * * *